(No Model.) 2 Sheets—Sheet 1.
W. P. BURKE.
BAND CUTTER AND FEEDER.
No. 507,879. Patented Oct. 31, 1893.
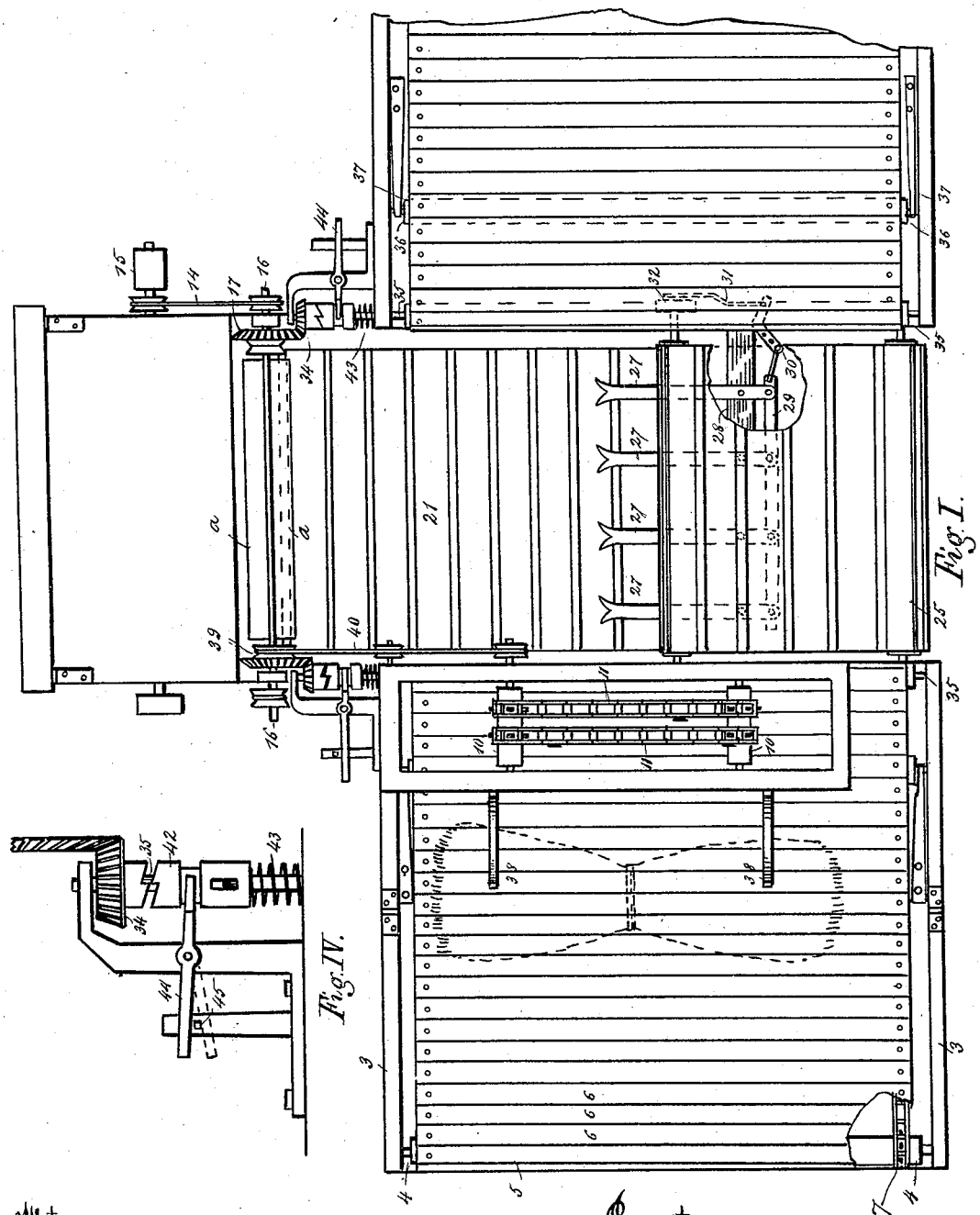
Witnesses
R. S. Millar
L. M. Adams
Inventor
W. P. Burke
By O. J. Bailey Atty

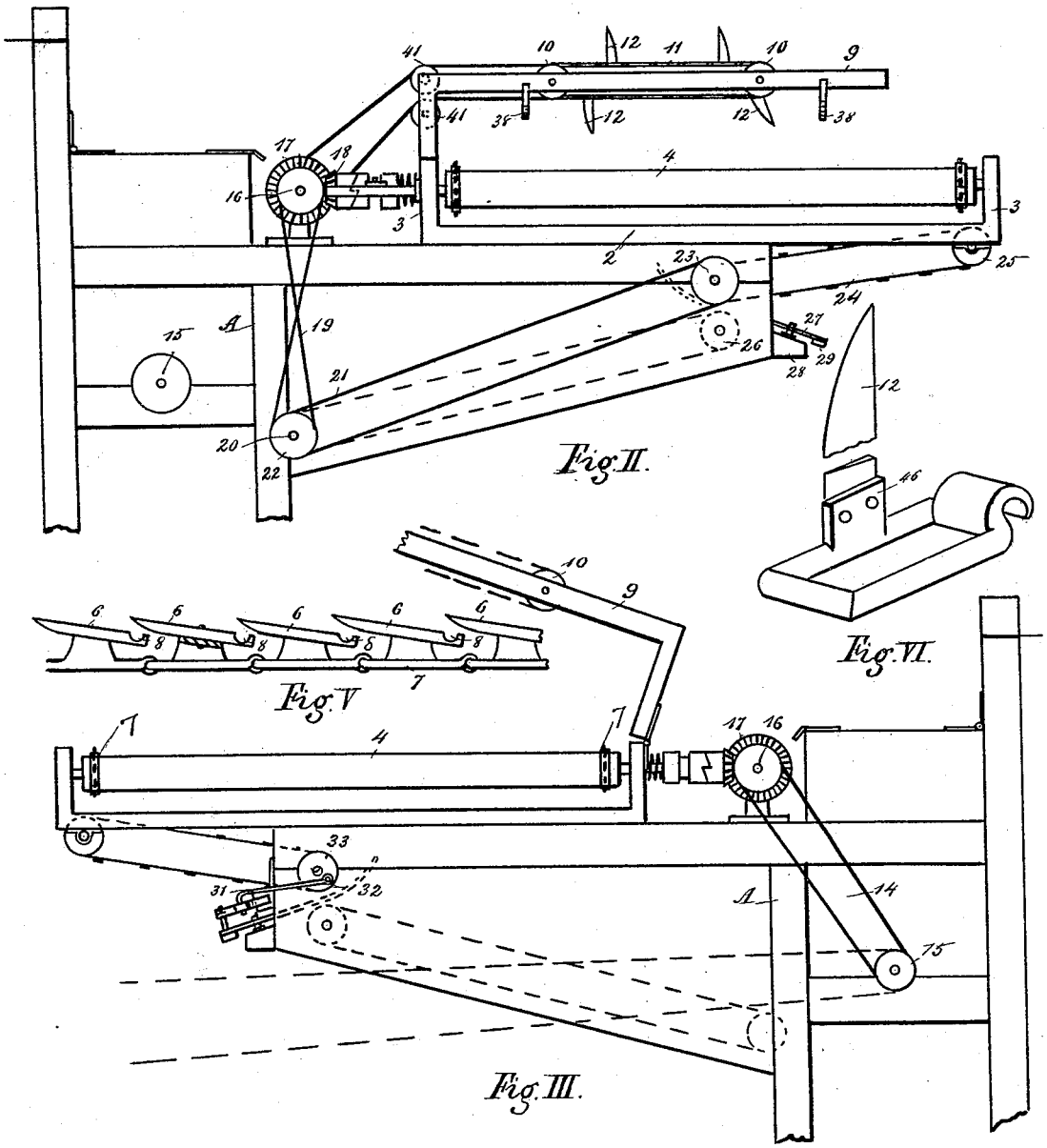

UNITED STATES PATENT OFFICE.

WILLIAM P. BURKE, OF EDINA, MISSOURI.

BAND-CUTTER AND FEEDER.

SPECIFICATION forming part of Letters Patent No. 507,879, dated October 31, 1893.

Application filed May 23, 1893. Serial No. 475,253. (No model.)

*To all whom it may concern:*

Be it known that I, WILLIAM P. BURKE, a citizen of the United States, residing at Edina, in the county of Knox and State of Missouri, have invented a new and useful Improvement in Band-Cutters and Feeders, which improvement is fully set forth in the following specification and accompanying drawings, in which—

Figure I is a top or plan view of my improved band cutter and feeder; Fig. II, an elevation of the left side of the machine; Fig. III, an elevation of the right side; Fig. IV, a detail of the clutch gear; Fig. V, a detail of the draper slats and their connections with the chain and Fig. VI, a detail of the knife belt.

My invention relates to improvements in band cutters and feeders for thrashing machines and its special object is an improvement of the apparatus described in my Patent No. 487,987, issued December 13, 1892.

This invention embodies an improved draper or carrier for conveying the bound sheaves within the range of a series of knives secured upon longitudinally running chain belts, so arranged as to cut the bands and discharge the opened bundles upon an apron or carrier, which bundles are subjected to the action of a series of vibrating arms adapted to loosen and distribute the mass as it descends to the thrashing cylinder. The device also contemplates two drapers and band cutters, one on each side of the machine. Either or both may be used as desired. Being practically similar, a description of one will suffice.

In the accompanying drawings, A designates the front portion of a thrasher, 2 represents a draper frame having vertical sides 3 in which are journaled rollers 4 over which moves the endless apron or draper 5 composed of slats 6 which are preferably secured to individual links of a sprocket chain 7 which runs upon sprocket teeth arranged in annular order upon rollers 4. This arrangement gives a positive movement. The slats are so arranged as to lap one over the other and are provided with channels 8 near the lapped edges to retain the shattered grain and discharge it into the thrasher. Above the draper and directly adjacent to the side of the machine is a knife carrier frame 9 hinged at its forward attachment to the draper frame in such a manner that it may be lifted up when occasion demands. Transverse rollers 10 are journaled in this frame and carry chain belts 11 upon which knives 12 are secured. The edges of these knives advance forwardly beneath the frame and sever the band as it passes across the path of the knive movement. The draper 5 is formed of slat sections each slat being secured to a peculiarly formed link having a transverse integral bridge portion elevated above the plane of the link thereby clearing the slats from the sprocket points. The draper frame 2 is formed of two sections which are hinged to enable them to be folded for convenience in transportation.

The operation of the device is as follows: The belt 14 is driven by the wheel 15 on the shaft of the thrasher cylinder, see Fig. III, and transmits motion to the transverse shaft 16 which carries the bevel gear 17. The grooved wheel 18 at the extremity of the transverse shaft 16 drives the cross belt 19, see Fig. II. The transverse shaft 20 carries the lower end of the apron 21. The outside pulley 22 on the shaft is belted to drive a similar transverse shaft 23 which drives the upper or front apron carrier 24 whose outer end runs upon the roller 25. The upper end of the lower apron is run upon a transverse roller 26 so placed as to afford an interval between the adjacent terminals of the aprons. Through this space is projected a series of vibrating arms 27 each of which is pivoted to a cross piece 28 and the shorter projections of these arms are connected by a bar 29 reciprocated by the angle lever 30 which is actuated by a pitman 31 and crank wrist 32 on the wheel 33. The bevel gear wheels 17 engage the gears 34 which drive the front shafts 35 of the drapers 5 and the latter carry the sheaves under the knife frames (only one frame is shown) and the band being cut the bundle falls on the vibrating arms and is loosened and distributed while descending to the thrashing cylinder. The intermediate roller 36 supporting the draper is journaled in resilient bearings 37 in order to yield downwardly when an unusually large sheaf is passed under the knives. Inclined guide arms 38, projecting from the knife frame 9 serve to depress loosely bound sheaves and prepare them to move freely under the knife frame. The pulley 39 on the transverse shaft 16 drives the knife belts through the medium of the belt 40 which runs over intermediate idlers 41, see Fig. II, which arrangement gives clearance for the sheaves. The clutch sleeve 42 is splined to slide on the shaft 35 in order to disengage from the end gear 34 which then turns loosely upon the extremity without driving the draper. The spring 43 normally forces the clutch engagement which is released by the lever 44 locked by a detent projection 45. The chain belt which carries the series of knives is provided at intervals with links of the form presented in Fig. VI showing a vertical side lug 46 to which the blade is riveted or otherwise attached. The transverse shaft 16 is provided with wings $a\ a$ adapted to beat the grain and prevent clogging as it enters the thrasher. If the bundles of grain be damp, the movement of the main feeder may be stopped for the time being by throwing off the driving belt. The damp grain may then be distributed and fed to the thrasher by hand.

What I claim as new is—

1. In a band cutter and feeder for thrashing machines, the combination with the thrashing cylinder, of the herein described duplicate hinged draper frames, knife carrier frames hinged at one end to the said frames, drapers or carriers moving upon rollers journaled in the said frames and provided with slats having overlapping edges grooved to retain the shattered grain and transfer the same to the main feeding draper, resilient rollers located under the knife carrier frames, and clutch mechanism as described to throw the carriers into or out of engagement with the thrashing cylinder, all arranged substantially as and for the purposes herein set forth.

2. In an attachment for thrashing machines, the combination with the herein described duplicate band cutters, carriers and their adjuncts as herein described of a main feeder or draper consisting of two sections as shown and provided with grooved slats having overlapping edges and a series of vibrating arms adapted to disentangle and distribute the loosened bundles and prepare them for free admission into the thrasher, substantially as herein set forth.

In testimony that I claim the foregoing I have hereunto set my hand, this 13th day of May, 1893, in the presence of witnesses.

WILLIAM P. BURKE.

Witnesses:
CHARLES B. LINVILLE,
ED. T. BURKE.